Jan. 14, 1969 D. R. COHEE 3,421,680
DISPENSING CONTAINERS AND BLANKS THEREFOR
Filed Sept. 5, 1967

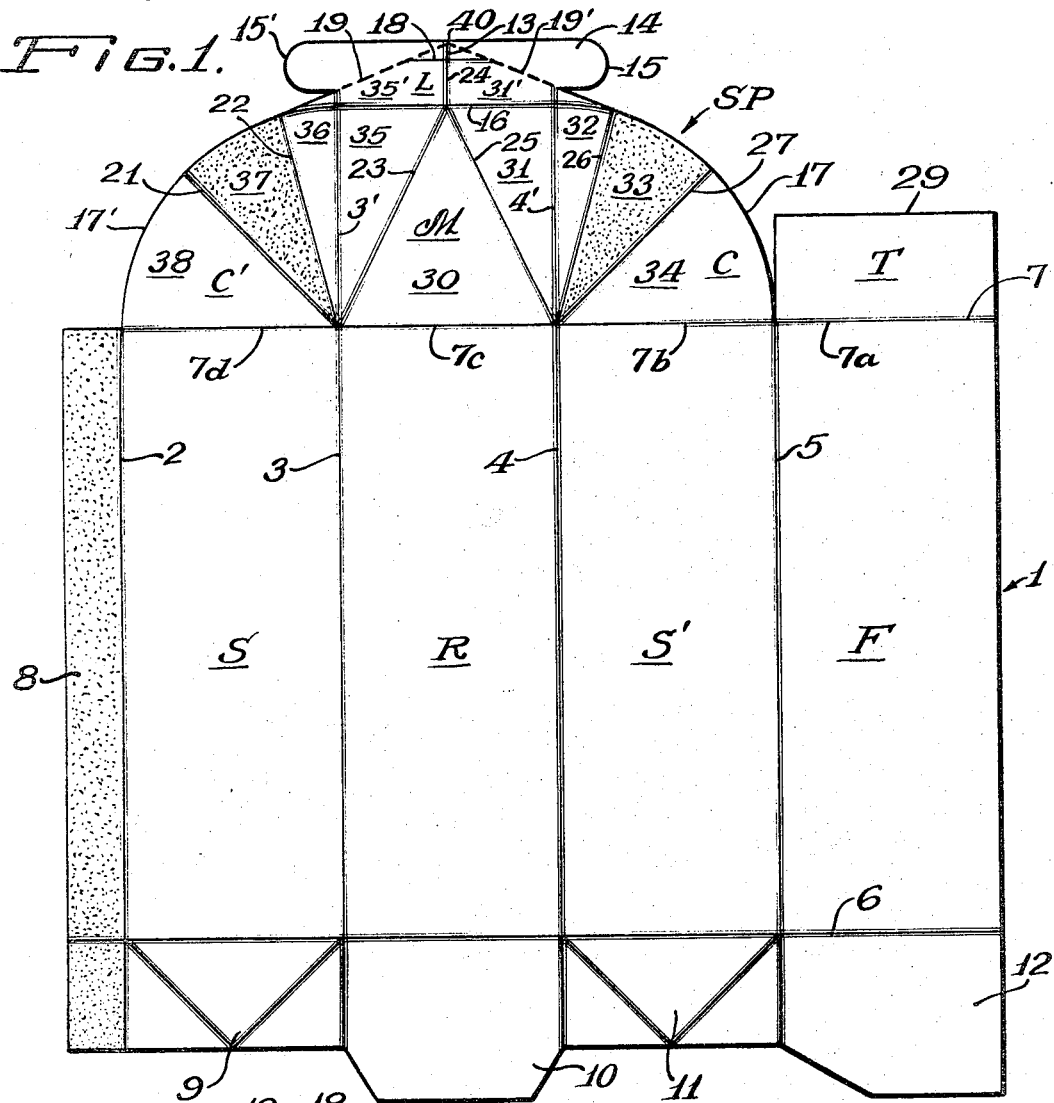
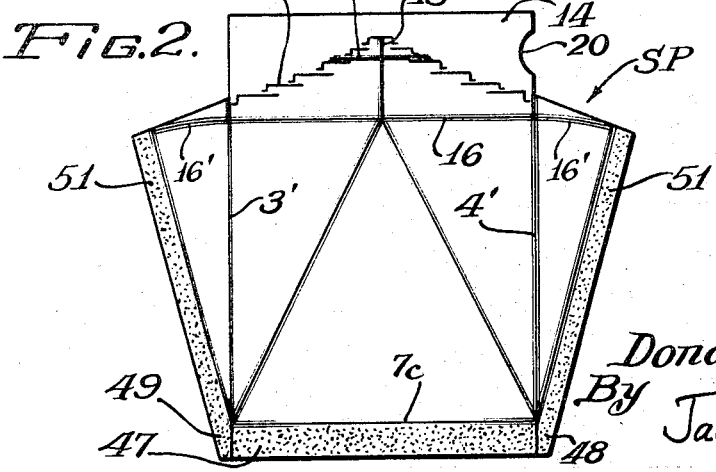

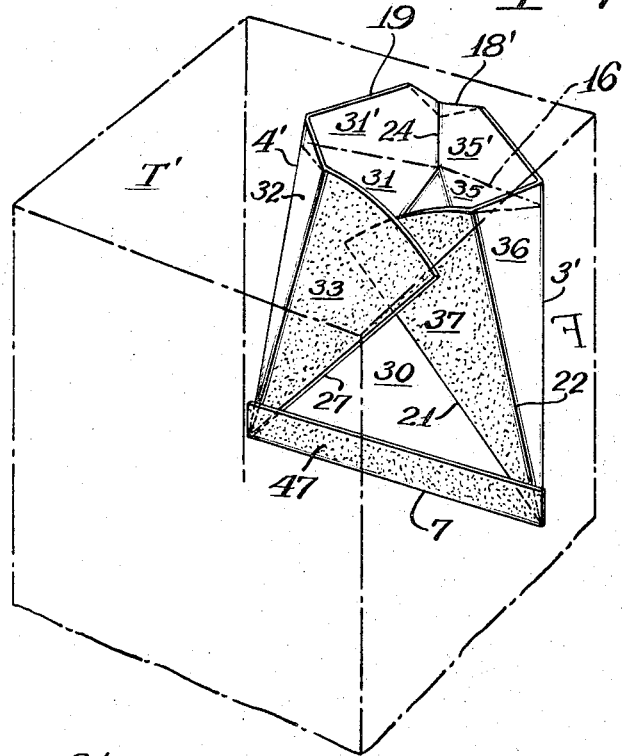
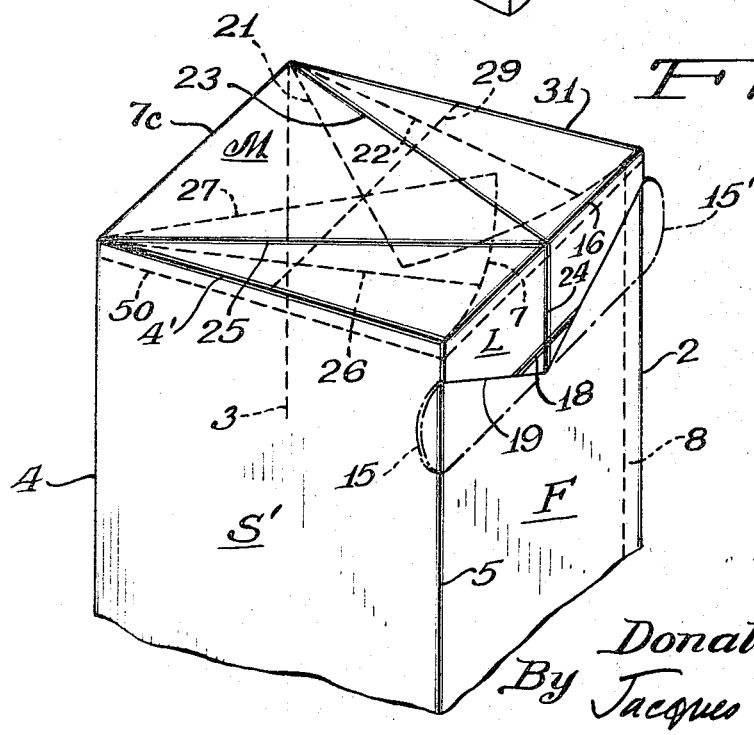

Inventor:
Donald R. Cohee
By Jacques M. Dulin Atty

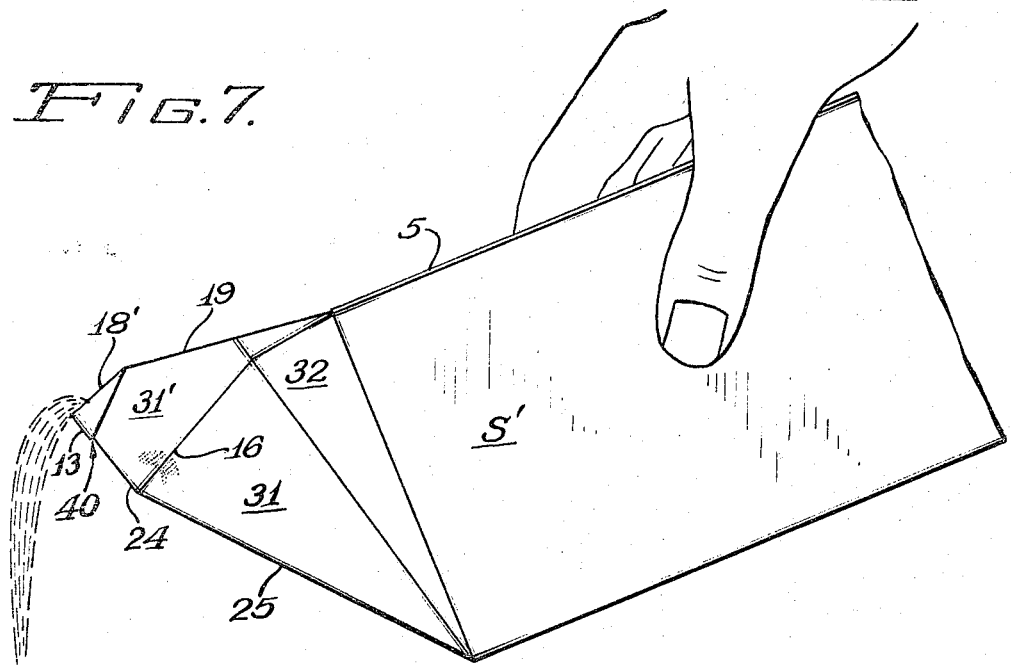
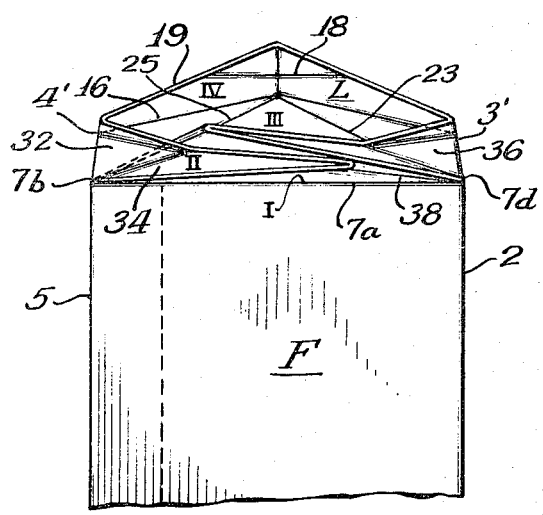
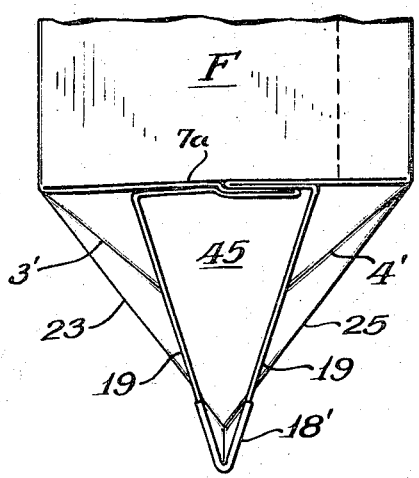

United States Patent Office 3,421,680
Patented Jan. 14, 1969

3,421,680
DISPENSING CONTAINERS AND BLANKS THEREFOR
Donald R. Cohee, Skokie, Ill., assignor to Colin Design Engineering, a partnership of Illinois
Filed Sept. 5, 1967, Ser. No. 665,485
U.S. Cl. 229—17                                    18 Claims
Int. Cl. B65d 5/74; B67d 3/00

ABSTRACT OF THE DISCLOSURE

The application discloses a spout and carton formed from a single blank, a spout-forming end panel of which has arcuate edges. The centers of the arcs are located at the corner intersections of adjacent side panels. The arcs are substantially quarter circles, not joined along a radial line but are separated by a webbing portion or mid-panel portion of the end panel substantially the width of a side panel. The mid-panel portion is integral with the arcuate end panels along a radial line and each arcuate edge blends into a lip-forming edge portion. The two lip-forming edge portions define a generally triangular portion of the spout-forming end panel that extends beyond the tangent line that would join the two arcs. The spout may be used separately or as an integral part of a carton, and a fold line that creates a sanitary pouring lip that is not exposed prior to usage is provided. The spout does not project into the carton interior and is reclosable, sanitary, one-piece, and substantially leakproof. A typical embodiment is a carton and blank for a flat-topped, end-opening milk carton which provides a volumetric economy of from about 19–45%. Cartons square, rectangular and trapezoidal in cross section incorporating the spout as a unitary part are disclosed.

SPECIFICATION

Field

The field of this invention is that of packaging, and more specifically, of dispensing containers having an improved pouring spout. The spout may be an integral part of the containers or may be separate and attachable thereto. The invention is also concerned with blanks for both cartons in which the spout is integrated, and the spout considered separately.

Although the recloseable spout of this invention may be applied to any suitable container, it is most generally useful in conjunction with containers adapted to retain and dispense materials in such forms as powder, granules, flakes, liquids, and the like, such as soap powders or flakes, beverages, dried pet food, or seeds. It is particularly adaptable to use in conjunction with cartons of paperboard or other suitable materials as they are generally used for dairy products containers. As in illustrative example, but not by way of limitation, a preferred embodiment of the invention is a milk carton of a waxed, plastic (e.g., polyethylene) coated or otherwise-treated fibrous material having an integral spout.

Prior art

The typical prior art fibrous-type carton for milk, fruit juice and the like is of square horizontal section terminating at its upper end in a gable roof. Such a carton is designed to be opened by forcing apart the forward edges of the upwardly and inwardly inclined opposite side panels, thereby breaking the forward portion of the gable rib. The inwardly folded portions of the inclined opposite side panels are pressed toward each other to force the mid-portion of the gable end panel forwardly whereby an open pouring mouth, rhombic in horizontal section, is produced. Such cartons are reclosable, but repeated folding or bending tends to weaken the carton material and cause portions of the wax-like coating to slough away. This is particularly the case since the gable fold is formed by folding the carton material 180° back on itself. Breaking of the gable rib or upper ridge to expose the lips of the spout that are hidden under and within the seal often leaves an irregular edge of torn paper that makes pouring difficult. This, is particularly the case when the sealing of the carton along the gable rib, through manufacturing error, extends too far down the rib and pinches a portion of the spout lips. Further, many people, and particularly children, find the necessary manipulation to be difficult or even beyond their capacity and they will therefore insert their fingers into the spout portions of the receptacles and into contact with the inner surfaces of the spout wall in order to properly flex the side and end panels so that the spout may be formed.

Further, in such cartons, the gable portion of the carton represents a major disadvantage of wasted space, and does not permit stackability of the cartons one on top of the other with its evident economic benefits. The gable top type of container has been extensively adopted, however, since it provides an integral spout. There were early attempts to use a flat top type of container such as shown in U.S. Patent 2,201,332. Such flat-topped containers were constructed with a nonintegral rupturable pouring top at one end of the carton. However, such cartons had to be assembled with the rupturable pouring top formed first, and the other end of the carton was then provided with a filling aperture in a separate end piece. Such pouring spouts were prone to leakage since the carton was filled with the pouring top inverted. An easy leakage path is available for liquid material, since the rupture line is directly opposite the space between the abutting lips of the inner folded spout.

Such flat-topped cartons possessed the additional disadvantage that upon being tipped over, the contents would be completely spilled since the bottom portion of the spout would be at the lowest liquid level, and the weight of the liquid would easily force the spout open.

Separate spouts have been designed for attachment to gable-topped containers as in U.S. Patent 2,757,830, and to flat-topped cartons as in U.S. Patent 2,077,341. In the latter patent a separate spout is attached to the side panel of a flat-topped carton. However, the liquid level is well below the top of the carton and somewhat below the upper edge of the spout lip. Such spouts open so that the forward lip of the spout was below the line at which the sides of the spout were secured to the carton. Thus, accidental opening was facilitated, and pouring was made quite difficult. Since added space had to be provided in the upper portion of the carton, a space savings was not realized.

A triangular spout that folds toward an adjacent side panel rather than inwardly toward the body of the carton also has been employed in aforesaid Patent 2,077,341. However, such a spout leaves at least one lip in an exposed exterior relationship, and sanitary conditions cannot be maintained thereby.

Typical end opening spouts separately attachable to the ends of cartons are shown in U.S. Patent 922,277. Such spouts leave an exposed pouring lip and offer no resistance to the weight of a liquid to prevent spillage in the event the carton is tipped.

THE INVENTION

Objects

It is among the objects of this invention to provide a novel spout and blank therefor that is attachable to paper type cartons, metallic cans, or plastic containers that has excellent pouring characteristics.

It is an object of this invention to provide a one piece blank for a carton in which portions thereof form an integral spout.

It is an object of this invention to provide a spout that does not project into the carton interior, that is recloseable, a sanitary, one-piece, of folded construction, and that has a sanitary pouring lip edge that is not exposed prior to usage.

It is another object to provide a spout or carton blank in which a line of spaced perforations is rupturable to form the spout lip.

It is another object to provide in a spout or carton blank a scored fold line that serves to define a sanitary pouring lip that is not exposed prior to usage.

It is a further object to provide a spout whether used separately or integral as part of a carton that is sanitary and is substantially leakproof.

It is a further object to provide novel tear strip portions in association with spout blanks.

It is a still further object to provide a carton for use with dry, granular, powder, flake, or liquid materials that is made from a one-piece blank having a portion thereof forming an integral spout that is recloseable, sanitary, and substantially leakproof.

It is a further object to provide a carton particularly useful for dairy and related products that is of square or rectangular horizontal cross section having a flat top and an integral spout therein that is stackable, substantially leakproof, and recloseable.

Other objects will become evident from the description which follows.

*In the drawings*

FIG. 1 is a blank for one embodiment of a carton having the spout of this invention integral therewith, the face showing being the outside of the carton;

FIG. 2 is one embodiment of a blank for a spout alone that may be attached to a plurality of types of containers.

FIG. 3 is a perspective view of a second embodiment of a spout in the one position viewed through the container (shown in phantom lines) to show the side of its attachment to a container;

FIGS. 4–7 are a sequential series showing the opening of a carton having a spout of this invention, and subsequent pouring of the carton contents;

FIG. 4 is a perspective of the upper end of a carton formed from the blank of FIG. 1 showing the integral spout in its closed position with one type of rip tab shown in phantom lines;

FIG. 5 is a perspective of a carton formed from the blank of FIG. 1 showing the spout of the invention partially open;

FIG. 6 is a perspective of the cartons of FIGS. 1, 4 and 5 in horizontal position preparatory to pouring, the spout being fully open;

FIG. 7 is a side elevation of the carton of FIG. 6 showing the relationship of the lip to the carton sides, and illustrates the orientation of the carton during pouring;

FIG. 8 is a plan view of the spout end of the carton looking into the fully open spout corresponding to FIG. 6;

FIG. 9 is a front elevation partly in perspective of the spout being formed from the blank in which an orientation and sequence of the folding is represented;

*Summary*

Figure 5:
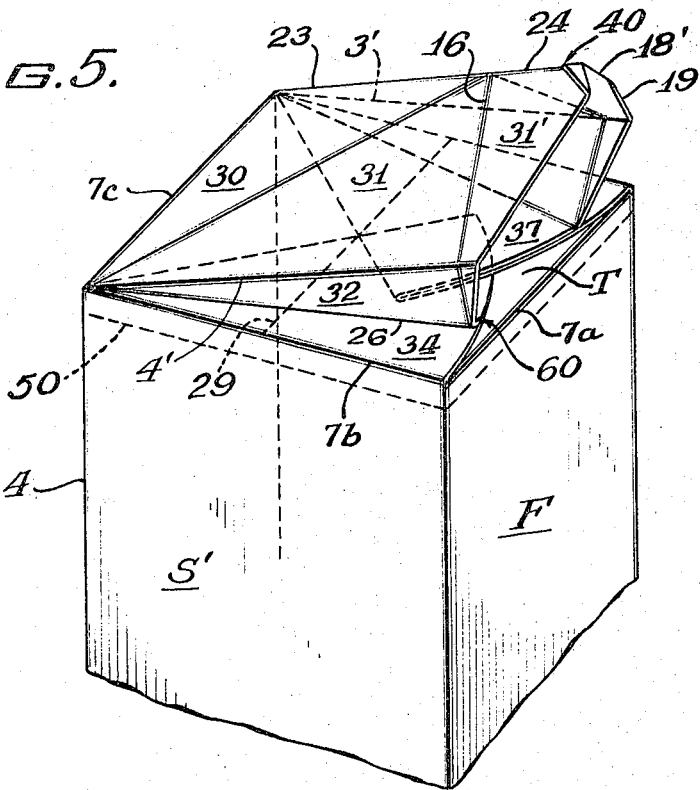

The spout and carton of this invention are formed from a single blank, a spout-forming end panel of which has arcuate edges. The centers of the arcs are located at the corner intersections of adjacent side panels. The arcs are substantially quarter circles, not joined along a radial line but are separated by a webbing portion or mid-panel portion of the end panel substantially the width of a side panel. The mid-panel portion is integral with the arcuate end panels along a radial line and each arcuate edge blends into a lip-forming edge portion. The two lip-forming edge portions define a generally triangular portion of the spout-forming end panel that extends beyond the tangent line that would join the two arcs.

DETAILED DESCRIPTION

The following detailed description is with reference to the accompanying figures in which similar elements are designated by like letters or numerals throughout. Scored fold lines are shown as shaded lines, and a tear line of spaced perforations is shown as a dotted line. While the following description is primarily with reference to a milk carton, it should be understood that such description is meant only as a nonlimiting example of the principles of the invention.

Referring now to FIG. 1, blank 1 consists of two side panels S and S', and two other side-type panels that for clarity are designated respectively rear panel R, and front panel F. Thesse panels are defined within the blank by fold lines 2, 3, 4, 5, 6 and 7. The front panel F is secured to the side panel S upon assembly of the carton by tab 8, which is stippled to show adhesive. Alternatively, where the blank material is of a waxed paper, or of a plastic, a plastic coated or plastic impregnated material, the adhesive may be eliminated, the blank material being self-sealing upon the application of heat. Similarly, end panels 9, 10, 11 and 12 are secured to each other by appropriately placed adhesive, not shown, or are self-sealing as described above to form the bottom of the carton. It should be understood that the carton may be assembled with the spout in a closed, secured position and the bottom left open for filling, or vice versa.

Also, in order that material may be conserved in cutting blanks from a continuous web of material, the largest bottom panel 10 may be located as an extension of a side panel S, S' rather than the rear panel R with the correspondingly-sized bottom panel 11 or 9 in its place. Thus, the triangular peak portion L, and/or the optional sealing tab 14, of a spout integral with the other end of an adjacent blank, can nest in the space formed, for example, by the relationship of bottom panels 10, 11 and 12. If desired, appropriate cut-outs can be made in bottom panels 10 and 12 to accommodate end portions of 15, 15' of the optional sealing tab 14 to facilitate such nesting of adjacent blanks. Since the bottom-forming panels of the carton are conventional and are not a limiting part of this invention, they will not be discussed further.

The integral spout is formed at the upper end of the blank from a first top end panel termed a spout panel SP. A second top end panel T is formed from the extension of front panel F above the fold line 7, and generally is about the length of half the distance between fold lines 7 and 16. As explained in more detail below, the spout portion, upon folding, is secured to the face of top panel T, adhesive being illustrative of one means for sealing, as above explained. Panel T forms an anti-gush baffle.

The spout panel SP has generally four main portions or sub-panels. There are two curved portions C and C' defined respectively between top fold line 7 and the extensions 3', 4' of vertical fold lines 3, 4. A mid-panel portion M is an extension of a side panel, in FIG. 1 the rear panel R, integral with and joining the two curved portions between fold lines 7 and 16. Fold line 16 is a fold line parallel to fold line 7 and intersects the arcuate edge 17, 17' of the curved portions C, C' exterior of the lines 3', 4'. The fourth portion is a generally triangular portion L disposed as an extension of the mid-panel portion M which contains the pouring lip edge of the spout along fold line 18 and edge 19.

Figure 13:
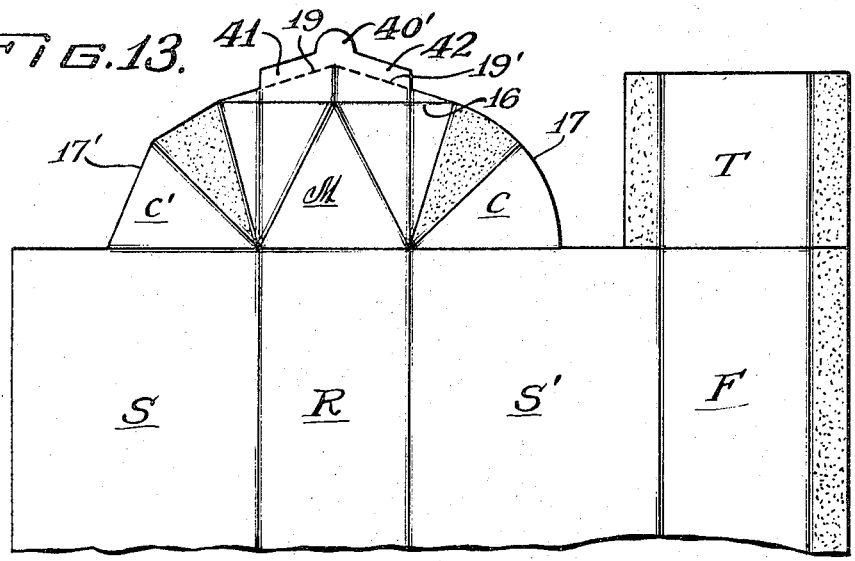
FIG. 13 is the spout end of a blank for the carton of FIG. 10.

The edge 19 is formed by tearing along a line of spaced perforations between the triangular lip portion L and the optional sealing tab 14. An alternative type of sealing or rip tab 14 is seen in the spout illustrated in FIG. 2, with fingernail engaging scallop 20 in place of graspable ears or end portions 15, 15' of the modification shown in FIG. 1. FIG. 13 shows still another embodiment.

The function of the fold lines 21, 22, 23, 24, 25, 26 and 27 of FIGS. 1, 2, 11 and 13 is best understood with reference to FIGS. 3–10. FIG. 4 shows a perspective view of the top of a square carton formed from a blank of FIG. 1 in the closed position. The sealing tab 14 is sealed to the face of the carton side F by adhesive applied to the underside of the tab as seen in FIG. 1, or by heat sealing as above described. The tab 14 is simply removed by pulling ears 15, 15' (FIGS. 1 and 4) or by inserting a finger in the space provided by scallop 20, to free the tab, as seen in the alternative form of tab in FIG. 2. It should be understood that any form of tab may be used, or the tab may be substantially omitted, as where a pull-type thread is sealed along the margin of edge 19 to release that edge secured to carton side F. The type of tab or means for sealing edge 19 is not critical to the invention.

Upon removal of tab 14 or the like the edge 19 may be raised to the position shown in FIG. 5. During the lifting of edge 19 the spout flexes along fold lines as shown, with segments 31 and 32 forming an accordian or bellows-type pleat along fold line 4'. Segment 34 is secured to top panel T by, for example, adhesive applied to the reverse side (as seen in FIG. 1) thereof. Alternatively, where it is desired to apply adhesive to only one side of the blank or web from which the blank is formed, adhesive may be applied to the face of top panel T (as seen in FIG. 1), in appropriate places, e.g., being sure that the area of panel T visible in FIG. 5 has no adhesive, so that the segments 31 and 35 do not stick thereto. Other methods of sealing may be provided as before. Segment 33 is in turn folded so that the face, as seen in FIG. 1, contacts the face of segment 34 with appropriate sealing being provided, e.g., as by adhesive applied to segment 33 or an appropriate area of segment 34. However, segments 31 and 32 and corresponding segments 35 and 36 must not be secured to each other in order to form the bellows-type pleat along fold line 4'.

As can be seen in FIG. 5, two important objects of our invention are achieved. Since the side panels R, S and S' are integral with the segments 31–38 and cantilever segment 30 forming the spout, there can be no leakage, particularly at corners such as the juncture of fold lines 7b, 7c, 4' and 4. Further, the sealing tab prevents leakage along, and contamination of, the only free edge that is formed along line 19 between fold lines 3' and 4'.

Still further, an important aspect of the present invention is the provision of fold line 18 in the lip portion L of the spout panel. As best seen in FIG. 5, the provision of that fold line, by the natural action of the forces acting on the segments and lip portion during opening, permits the two small triangular portions defined between lines 18, 19 and 13 to fold back on the exterior face of the lip portion L exposing a fresh, clean edge that forms the pouring lip 18'. The scored fold line 18 may be moved closer to fold line 16 (FIG. 1) so as to expose a longer fresh pouring lip 18' if desired. With proper placement of a fold line 18 that forms a fresh pouring lip 18' the sealing tab 14 may be entirely omitted, edge 19 being itself sealed to the carton side F. Upon opening the spout, the relatively torn or rough edge 19 is present on the interior face of the spout along only a part of segments 31' and 35' reversing itself to the exterior of the lip at the points of fold where fold line 18 intersects fold line 19. The fresh lip 18' may be provided of such size that upon pouring, the contents will not pass along lip 18' to contact the edge of line 19. It is natural to open such a spout having no sealing tab portion by lifting the apex 40 of the triangular lip panel portion L. However, no unsanitary condition can result since the actual lip 18' is sufficiently distant from that point. As an alternative, the point 40' may be enlarged as in FIG. 13 as the starting or releasing point of a sealing tab or sealed margin portions 41, 42. Lines 19 and 18 are there true fold lines. In this alternative, line 19 is not perforated and the reverse faces of panels 31' and 35' are not sealed to side F of the carton, the sealing being effected in margin portions 41 and 42. Upon opening, point 40' and margin portions 41 and 42 are folded toward lip panel segments 31' and 35' respectively in a fashion analogous to tip 40 in FIG. 5.

Figure 6:
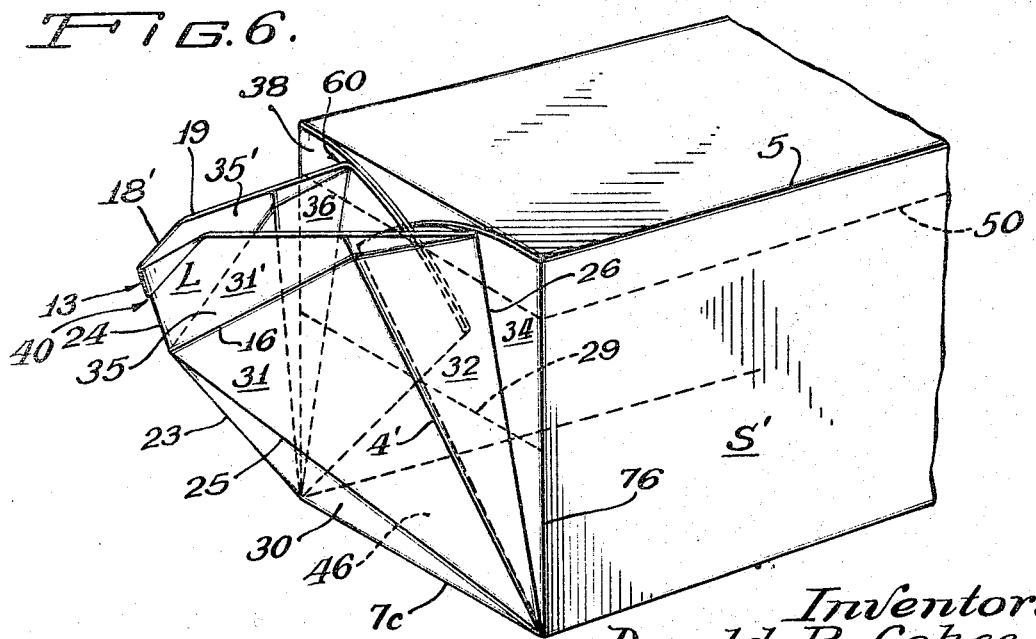
Figure 11:
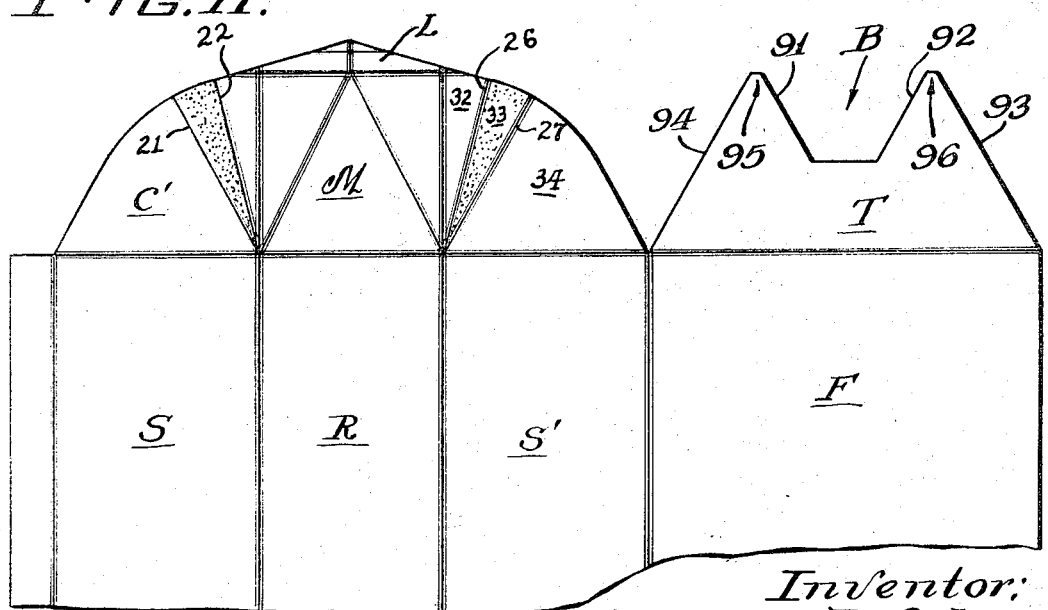
FIG. 11 is the spout end of a blank for the trapezoidal carton of FIG. 10.

Fold line 16 may extend as a straight line across segments 32 and 36 to intersect edges 17, 17' of the spout panel, as in FIGS. 5, 6 and 11, or may be curved as 16' in FIGS. 1 and 2.

It should also be understood that the scored fold line 18 may be omitted where a sealed closure sanitarily housing a pouring lip is not a requirement, e.g., for soap powders, powdered plaster, insecticides, powdered or liquid glue, solvents, bleach, or the like. Also, where a suitable tear tab is employed, the apex 40 of the spout and a portion of the edge 19 can serve as the pouring lip.

FIG. 6 shows the spout of this invention in the fully extended position, such as just prior to pouring. Each pair of bellows pleat segments 31, 32 and 35, 36 lie in a substantially common plane, and with the respective lip panel portions 31', 35' form a triangular spout opening best seen as 45 in FIG. 8, which is a view into the spout of FIG. 6. Although the formation of the spout may be initially assisted by thumb and forefinger pressure on fold lines 4' and 3' respectively (FIG. 5) in order to flex open the corresponding bellows pleats, the weight of the carton contents, e.g., liquid or soap powder, as it flows into the spout will automatically open the spout to its full extent. An axial line of pouring is defined as parallel to edge 25 and folds 24 and 13.

As best seen in FIGS. 6 and 7, an important object of my invention is accomplished by the provision of the lip panel segments 31' and 35'. Without such segments, the lip of the carton would be at the level of fold line 16 which is a substantial horizontal distance below the carton edge formed along fold line 5. Thus, were the carton to tip over from the position of FIG. 5 to that of FIG. 6, liquid contents would spill over such a lip along line 16. However, in the present invention, the height of the triangular lip panel portion L (FIG. 1) along line 24 between lines 16 and 18 is chosen to insure the lip 18, 19 being above the carton edge 5, as seen in FIG. 6. This relationship can also be seen by turning FIG. 7 so that the edge 5 is in horizontal orientation. Although there is considerable centrifugal force tending to throw the contents out of the carton where it tips over from the position of FIG. 5 to that of FIG. 6, there are three structures provided by this invention that resist the spilling. First, the height of the spout lip 18, 19 above the horizontal line 5 of the carton (or at least above the contents level) provides a retaining dam. Second, the flexing of the bellows pleats along 3', 4' during the opening of the spout from the position of the carton in FIG. 5 to that of FIG. 6 acts as a natural damper to the kinetic energy of the outrushing contents; it takes some energy from the contents to push open the spout. Third, the opening from the carton into the spout is constricted by the edges 21, 27 of the infolded panels 37, 38 and 33, 34 respectively, as reinforced by the panel T (FIG. 1) to form a baffle that resists the outflow of the contents. Also, because a baffle prevents rapid replacement by air of the volume of liquid leaving the carton, lowered pressure will be created within the carton further resisting spillage. The baffling may be increased by lengthening the panel T so that the edge 29 (FIG. 6) is closer to edge 7c so that opening 46 is smaller and no longer triangular. Control of the flow characteristics is also obtained by varying the baffling in proportion to the predetermined length of panel T, forming an antigush baffle.

It is also evident that the carton may be stored in a horizontal position and even after opening will not spill should the spout be opened as in FIG. 6. It may be desirable to provide a tab appropriately positioned and secured to panel F to engage lip apex 40 to insure reclosure. However, the original pressure scoring of the fold lines of the spout is ordinarily sufficient that the spout will return to the substantially closed position. The spout will not remain as open as that shown in FIG. 5, and ordinarily the crease formed on the inner surface along fold line 16 will sufficiently frictionally engage the carton edge 7a and be substantially closed. Further, opening will be resisted by the fact that the panels L and M, FIGS. 1 and 4, are then at right angles and are pivoted only along edge 7c making it difficult to pass edge 7a, also a right angle intersection of the plane of the top of the carton and the side F. Still further, the flexing of the panel M along lines 23 and 25 tends to bow the panel upwardly slightly in the center (concave down) which assists the frictional hugging of the crease 16 and lip portion L to the carton edge 7a and side panel F.

The pouring characteristics of the carton are observed to be excellent, as above described. Further, by reference to FIGS. 7 and 8, it will be seen that upon pouring, the weight of the contents both extends the spout to its fullest open position and also pinches together the lip along edges 19, 19' (FIG. 8). Thus, during pouring the stream tends to become smaller in size, due to the pinching together of segments 31' and 35', and excellent control is obtained. This is particularly useful where qualitative or quantitative measurement of poured contents is desired. Also, this feature plus the baffle prevents spillage since the pouring is relatively constant or diminishing rather than an initial small stream followed by an uncontrollable surge of contents, as in the case, e.g., of conventional round mouth glass milk bottles having a shoulder, or of gable-topped fiber containers in which there is no baffle and the lip bottom is on substantially the same horizontal line as, or below, the lowest side of the container when tilted for pouring.

It should be appreciated that the projection of edges 25 plus 24 is longer than the edge 7a to carry the lip edge 18, 19 above the edge 5 (FIGS. 6 and 7) to insure against spillage. However, since the volume of the spout is substantial the actual contents level will be below edge 5 in FIG. 6. The contents level will be even lower in volumetric proportion to the amount of space left above the liquid level 50 and the spout-top of the carton (FIG. 4). Thus, the critical length of edges 25 plus 24 (or 25 plus 24 and 13 where the fresh edge construction 18' is not desired) is determined by the equivalent contents height, and may be shorter than the edge length 7b. The latter is particularly true in the case of powders, which do not act as true fluids insofar as they do not initially uniformly seek their own level in the spout as compared to the interior of the carton. Since the bellows pleat feature of the spout is part of the invention, the spirit of the invention may not be avoided by dispensing with the lip portion L where feasible.

FIG. 9 shows a sequence of folding to assemble the spout end of the carton. The carton tube is formed by folding along fold lines 2, 3, 3', 4, 4', and 5 and panel 8 is secured to the inside of panel F, edges matching; then panel T is folded in along fold line 7a to create corresponding edge 7a as represented by spout fold sequence FIG. 9 as I. The remaining portions C, C', M and L or the spout panel form a U-shape being folded along lines 3' and 4'. As step II, portion C' is then folded inwardly along fold line 21. The bellows pleat along fold line 22 need not be formed at this juncture since the scoring or impression in the blank material will permit proper flexing upon first opening. In step III portion C is folded inwardly along fold line 27 and the pleat formed thereby is overlaid on II. The folding in steps II and III may be facilitated by commencing to fold the portion M along fold line 7c, and the folding is completed to bring portion M horizontal in step IV. The final step V is the folding of lip portion L along fold line 16. The sealing of panel T to the inside (hidden side in FIG. 1) of portion or segment 38, and 37 in turn to the outside (face side of FIG. 1) of 38, and 34 to 37 and T, and 33 to 34, may be done sequentially after each folding step, or simultaneously at the completion of steps II, IV or V. Also the sequence of folding steps II and III may be reversed so that pleat formed at II overlies that of III. The sequence may be interrupted after III for filling of the carton, or the carton may be filled first and the spout then formed, or the spout formed and sealed with a pull tab or the like and filled from the bottom, the spout being leak-proof for such filling.

With respect to the spout alone, FIGS. 2 and 3 shows blanks for a spout which may be attached to a container. The material from which the blank is formed may be sufficiently flexible as to be applicable to a curved surface of a container, and may be placed on any of the sides of the container, or ends.

In the embodiment of FIG. 2 the segments 33, 34, 37 and 38 (as seen in FIG. 1, for example) are not present so that an appropriate opening must be provided in the container wall, and may incorporate a baffle by being smaller than the maximum possible opening. Securing tab 47 may contain adhesive on either side depending on whether the tab is to be secured to the carton in an upward, downward, interior or exterior position. It is preferred to have the tab 47 upward or interior of the carton, in both cases with adhesive on the side seen in FIG. 2. Depending apices 48, 49 of side securing tabs 51 insure a tight seal at the lower corners of the spout since they overlap the securing tab 47.

FIG. 3 shows a perspective view of still another embodiment of the spout of this invention from the interior of a carton to illustrate the sealing surfaces 33 and 37 and opening. Fold line 16, shown in phantom, is used in an embodiment wherein the spout is placed nearer the top of the carton so that segments 31' and 35' fold back over a portion of top T', just as lip portion L folds over side F in FIG. 4.

Figure 12:
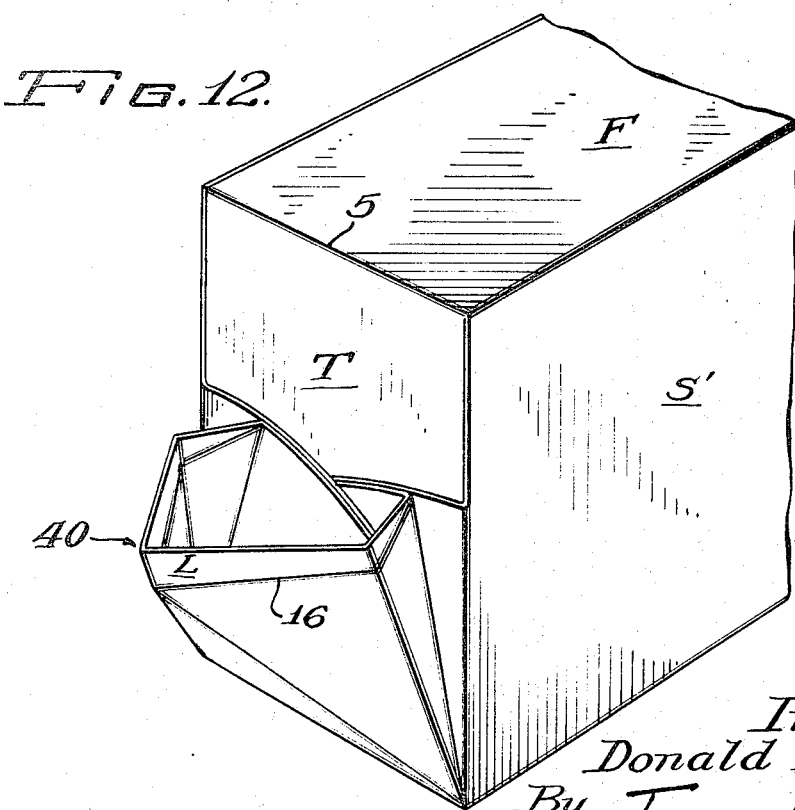
FIG. 12 is a perspective of the spout end of a carton of rectangular cross section showing the partly open spout adapted thereto as an integral portion of the box.

FIGURE 13 shows a blank for a carton rectangular in cross section, and FIG. 12 shows the corresponding assembled carton as embodying an integral spout of this invention. As can be seen best in FIG. 12, the lip portion L does not fold at right angles over a side but is releasably secured to the top. Although the spout lip apex 40 does not extend above edge 5 when in pouring orientation, this is not required for its major utility of a detergent powder carton. Such spout does have the characteristic of being an approximate measuring spout, i.e., a unit measure of detergent will flow from the spout when the carton is poured in a single continuous rotary motion. The spout is also an integral portion of the carton blank. Fold line 16 may be omitted along with lip forming fold line 18 (not shown).

The volume and height savings enabled by the flat-topped cartons of this invention are considerable, particularly as compared to gable-topped paper milk cartons. In the gable-topped cartons the gable is of relatively constant height regardless of whether the carton is a half gallon, quart, pint or half-pint size. The height and volume savings range from about 18.6% to 44.5%, and the stackability of the cartons lends them to pleasing displays.

The preferred relationship of the size of segments 32, 33, 34 and 36, 37, 38 subdividing the arcuate portions C and C' is 1:2:3; expressed in terms of the respective acute angles, segments 32 and 36 are each 15°, segments 33 and 37 are each 30°, and segments 34 and 38 are each 45°. Referring to FIG. 5, the size of panel 32 defines the placement of the line 26 inwardly from line 7b defining the upper edge of side S'. The larger panel 32 is, the longer edge 34 plus 13 must be to bring the lip edge 19 above the required contents level or edge 5

(FIGS. 6 and 7). Also, the triangular pouring area 45 (FIG. 8) becomes smaller and the pinching by lips 19, 19' reduces the pouring stream to an impractical trickle. On the other hand, as the size of segment 32 is reduced, the less the spout mid-panel M will open to form a spout and will act merely as an end flap cut along line 7a. Within such practical limits the angular relationship between lines 26 and 27 in portion C, and the corresponding lines in C', can be varied to define operative areas for segments 32–34 and 36–38.

The point of intersection of edge 19 with edge 17, and of corresponding edges 19' and 17', may be to the right or left of the position shown in FIG. 1. When the place of joinder is as shown in FIG. 1, where the fold line 26 joins the edge of the spout panel SP, the point 60 is spaced away from edge 7a. The segment 33 just overlies segment 34 with no overlap of 33 onto end panel T. The place of joinder of 17 and 19 is desirably no further to the left (FIG. 1) than the fold line 4'. FIG. 5 shows the position of joinder of 17 and 19 farther to the right along arcuate edge 19 than in FIG. 1. The joinder occurs on the edge 19 a distance equal to the angular value of segment 32 from fold line 26 toward fold line 27. Where segment 32 is 15°, the joinder is at the midpoint of the arc of segment 33. This proportioning places point 60 (FIG. 5) at the edge 7a, which is the highest desirable placement. Where the edge 17 is drawn as a tangent to the arcuate edge 19 at fold line 27, i.e., 90° from fold line 27, there will be an undesirable excess of material projecting above edge 7a which forms a lump when portion L is folded to the closed position. Thus the preferred positioning of the joinder is between fold line 26 and the above-defined angular position in segment 33, with the latter being the presently preferred place as seen in FIG. 5.

Figure 10:
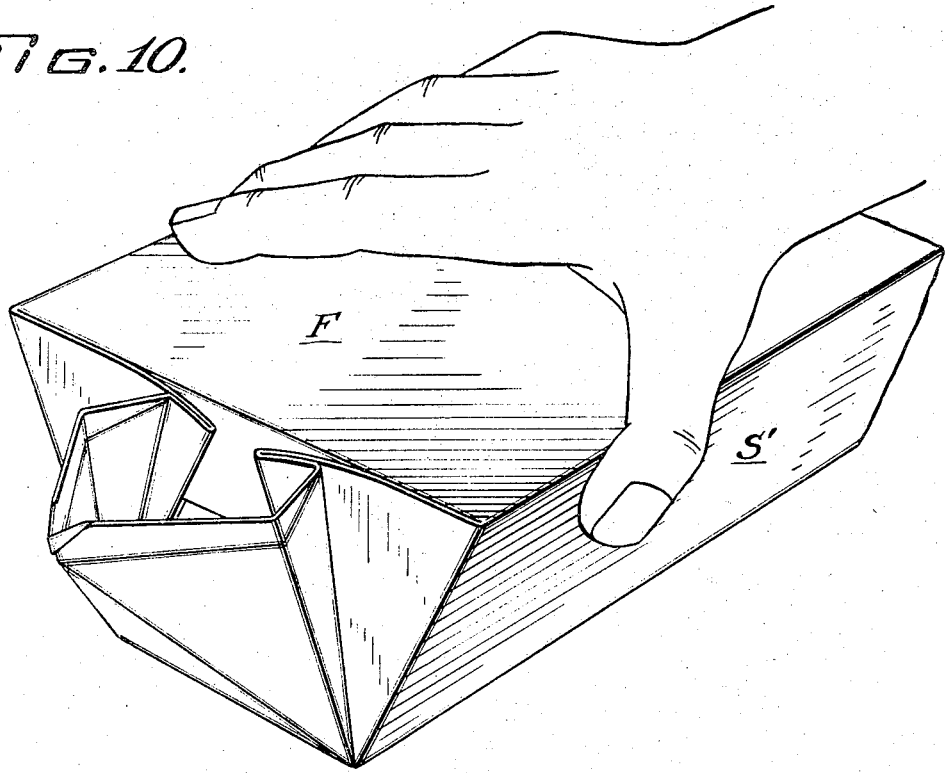
FIG. 10 shows a carton trapezoidal in cross-section utilizing the spout of this invention as an integral part thereof.

FIG. 10 shows an alternative form of carton in which the panels S, S' and F have been widened so that the carton is trapezoidal in cross section. As seen in FIG. 11, top panel T is correspondingly trapezoidal in shape with an appropriate baffle cut-out B, rather than rectangular as the cartons of FIGS. 1, 4–9, 12 and 13. The sloping sides 91, 92 of the baffle cut-out may be spaced, at their distal ends, somewhat inwardly from edges 93, 94 to form broadened tips 95, 96 to insure a leak-proof seal between the top panel and spout panel, at the point where those tips underlie the spout. The trapezoidal carton is particularly easy to handle during pouring since fingers and thumb curl naturally around the edges of the wide side F to follow the sloping-away side panels S and S', as seen in FIG. 10.

In the case of the trapezoidal carton, the angular relationship for the fold lines 21, 22, 26 and 27 in the arcuate portions of the spout panels is defined in part by the angular relationship between the sides S and S' and the rear side panel R. The sides S and S' are inclined outwardly by an angle whose $$\text{tangent} = \frac{\frac{1}{2}(F-R)}{R}$$

when F and R represent the length of the sides F and R respectively and portion M is square. In the case of the carton of FIG. 10 where $F=2R$, the angle is about 26½°, and the proportionate size of segment 34 will be twice 32 or 33 plus the above angular amount.

It will be understood by those skilled in the art that the detailed description of the exemplary embodiments of the sanitary lip, spout, blanks, and containers are merely illustrative of the principles of the invention and obvious changes or equivalent substitutions may be made thereto without departing from the spirit of the invention which is limited only as indicated in the appended claims. With particular reference to equivalence, it should be understood that a claim to a carton is meant to include a carton and corresponding blanks therefor, and that panel portions and segments thereof as herein described can be referred to as panels per se. As seen in the spout panel of FIG. 13, the definition of margins as being substantially arcuate includes both true, smooth arcs as 17, and chords as 17'. The material of the spout is preferably of any flexible material such as paper, coated paper, plastic, or thin metal but the individual panels, portions or segments need not be flexible so long as the fold lines are designed with hinge-like flexibility. Thus, rigid metal or plastic sections could be joined by continuous cloth, paper, or plastic strips or taping to form flexible hinges. The spouts may be attached to rigid containers of all shapes.

I claim:
1. In a spout having a lip panel, the improvement which comprises providing a lip-forming fold line spaced from the margin of said panel, said fold line being disposed at an angle to the pouring axis of said spout to define a portion of said fold line and said margin, said defined portion being adapted to fold over the exterior surface of the remaining portion of said panel, thereby to expose a fresh sanitary pouring lip along the interior edge of said fold line.

2. An improved spout as in claim 1 wherein: said spout is formed from a plurality of panels defining a generally polygonal pouring opening, one of which panels has two contiguous portions foldable along a line parallel to the axis of pouring, said lip-forming fold line being oriented at substantially right angles to said axially parallel fold line, and said lip-forming fold line extending to intersect the margins of said two portions.

3. A unitary spout comprising:
   (a) first, and
   (b) second panels,
       each of said panels having a substantially arcuate margin and at elast one radial fold to form a bellows pleat therein, and
   (c) a central panel,
       contiguous with said first and second panels along a radial fold line and disposed between said first and second panels, said central panel having folds therein that cooperate with said bellows pleats whereby portions of said central panel form with said first and second panels sides for said spout in the unfolded position, and said bellows pleats being positioned under said central panel in the folded position.

4. A spout as in claim 3 which includes:
   (d) a generally triangular panel contiguous with said central panel for forming the spout lips, said margins of said triangular panel joining the arcuate margins of said first and second panels.

5. A spout as in claim 4 wherein a first fold line bisects said triangular panel substantially along the geometric height of said triangular panel parallel to the pouring axis of said spout, thereby to provide two portions of said triangular panel as extensions of said spout sides contiguous with said central panel.

6. A spout as in claim 5 wherein a second fold line for forming a lip is provided in said triangular panel substantially at right angles to said first fold line and spaced from said margin of said triangular portion to define a portion of said triangular panel between said second fold line and said margin said defined portion being adapted to fold over the exterior of the remainder of said triangular panel, thereby to form and expose a fresh sanitary pouring lip along the interior of said fold line.

7. A spout as in claim 3 wherein:
   said central panel is rectangular and two sides of which are contiguous with said first and second arcuate panels along a fold line substantially defining a radius of each of said arcuate panels, and which includes:
   (a) a generally triangular panel contiguous along its base with a third side of said rectangular central panel, and having substantially straight margins which intersect said substantially arcuate margins, said rectangular central panel being subdivided into a first, a second, and a third segment by a pair of fold lines commencing at the corners contiguous with said first and second arcuate panels at points substantially the geometric center of each of said substantially arcuate margins and extending to the midpoint of said third side of said rectangular central panel contiguous with said triangular panel, said triangular panel being subdivided into at least two segments by a first fold line that is substantially the geometric height of said triangular portion and, a part of said first and second panels forming, in a fully unfolded position, with said first and second segments of said rectangular central panel and said segments of said triangular panel, a pair of substantially planar spout sides, which intersect along said geometric height fold line of said triangular panel, and are separated by, but contiguous with, said third segment of said rectangular central panel portion, said third segment being disposed at a substantially right angle to the plane of each of said sides, whereby a spout having a substantially triangular pouring opening is formed.

8. A spout as in claim 7 wherein a second fold line for forming a lip is provided in said triangular panel substantially at right angles to said first fold line and spaced from said margin of said triangular portion to define a portion of said triangular panel between said second fold line and said margin, said defined portion being adapted to fold over the exterior of the remainder of said triangular panel, thereby to form and expose a fresh sanitary pouring lip along the interior of said fold line.

9. A container, polygonal in cross section, former from a unitary blank and having an integral spout therein comprising:
(a) four contiguous side panels for forming a front side, a first side, a second side, and a rear side panel respectively,
(b) four bottom panels contiguous with and disposed at one end of each of said side panels for forming a continuous sealed bottom,
(c) a first top panel contiguous with said front side panel disposed at the end opposite said bottom panels,
(d) a second top panel, contiguous with the remaining three of said side panels disposed at the end opposite said bottom panels, for forming a spout, said spout panel comprising contiguous (i) first, (ii) second, and (iii) third portions,
said first and second portions having substantially arcuate margins,
said side panels being nonadjacent side panels,
said third portion defining a mid-panel contiguous with said back side and said first and second portions,
said first and second portions having fold lines for forming bellows pleats, disposed radially outwardly from the point of juncture between said first and second portions, and
said mid-panel, and
the corresponding said first and second sides and said rear side, the segment of each of said bellows pleats which is continuous with said first and second sides being secured to said first top panel in a folded condition,
said mid-panel having folds provided therein for forming segments thereof which cooperate with segments of said bellows pleats to form sides of said spout in an unfolded position, said folds being positioned to define a triangular segment in said third portion whereby a spout triangular in cross section is formed.

10. A container as in claim 9 wherein all of said sides are equal in width to form a carton square in horizontal cross section.

11. A container as in claim 9 wherein two of said nonadjacent sides are equal in width and larger than said front and said back sides to form a carton rectangular in horizontal cross section.

12. A container as in claim 9 wherein said front side is larger in width than said rear panel to form a carton trapezoidal in horizontal cross section.

13. A container as in claim 9 wherein said spout panel includes: a fourth portion of generally triangular shape contiguous with said midpanel portion and disposed opposite said contiguous juncture between said mid-panel portion and said rear side, the margins of said triangular portion joining said substantially arcuate margins of said first and second portions, for forming said spout lips.

14. A container as in claim 13 wherein a first fold line bisects said triangular panel substantially along the geometric height of said triangular portion, thereby to provide two segments of said triangular portion as extensions of said spout sides contiguous with said midpanel.

15. A container as in claim 14 wherein a second fold line for forming a lip is provided in said triangular portion substantially at right angles to said first fold line and spaced from said margin of said triangular portion to define a part of said triangular portion between said second fold line and said margin, said defined part being adapted to fold over the exterior of the remainder of said triangular portion, thereby to form and expose a fresh sanitary pouring lip along the interior of said fold line.

16. A container as in claim 15 wherein said arcuate portions have two radial fold lines disposed to trisect said panel into three segments, the first segment of which is contiguous with a side panel and is secured to said first top panel in a folded condition, the second segment of which is contiguous with said first segment and which is folded thereover and secured thereto, the contiguous junctures between said first, second, and said third portions of said spout panels defining fold lines, and said fold lines in said mid-panel extending from the corners of juncture of said mid-panel with said back side, and said first and second portions of said spout panel with said first and said second sides, to the mid-point of a fold line along the contiguous juncture of said triangular portion and said mid-panel, the two segments defined by said fold lines in said midpanels, said fold lines along the contiguous juncture of said mid-panel and said first and second portions, and the fold line in said first and second portions which is disposed closest to said contiguous juncture fold line, cooperate to form said bellows pleat, which in the open condition of said spout forms said spout sides.

17. The carton of claim 16 wherein said first top panel is dimensioned to assist in forming an anti-gush baffle.

18. The carton of claim 16 wherein said two fold lines in each of said first and second portions define segments of area in the proportion of 1:2:3, the angles lying respectively 15° and 45° from the fold lines along the contiguous junctures of said mid-panel and said first and second portions.

References Cited

UNITED STATES PATENTS

| | | |
|---|---|---|
| 615,417 | 12/1898 | Wilcox. |
| 1,698,338 | 1/1929 | Lewin. |
| 3,118,586 | 1/1964 | Kelly _____ 229—17 |
| 3,185,360 | 5/1965 | Smith _____ 222—528 |
| 3,250,436 | 5/1966 | Kurtz _____ 222—528 |

DAVID M. BOCKENEK, Primary Examiner.

U.S. Cl. X.R.

229—7; 222—528